(12) United States Patent
Zappulla

(10) Patent No.: US 8,938,237 B2
(45) Date of Patent: Jan. 20, 2015

(54) STAMPING MECHANISM FOR BEACON MESSAGE TRANSMISSION

(75) Inventor: Fabrice Zappulla, Berkshire (GB)

(73) Assignee: NEC Corporation, Tokyo (JP)

( * ) Notice: Subject to any disclaimer, the term of this patent is extended or adjusted under 35 U.S.C. 154(b) by 122 days.

(21) Appl. No.: 13/636,941

(22) PCT Filed: Mar. 18, 2011

(86) PCT No.: PCT/JP2011/057500
§ 371 (c)(1),
(2), (4) Date: Sep. 24, 2012

(87) PCT Pub. No.: WO2011/118825
PCT Pub. Date: Sep. 29, 2011

(65) Prior Publication Data
US 2013/0012201 A1 Jan. 10, 2013

(30) Foreign Application Priority Data
Mar. 24, 2010 (EP) .................................... 10157561

(51) Int. Cl.
*H04W 4/00* (2009.01)
*H04M 1/00* (2006.01)
(Continued)

(52) U.S. Cl.
CPC .............. *H04W 48/12* (2013.01); *H04W 88/06* (2013.01)
USPC ...................... 455/435.2; 455/434; 455/552.1

(58) Field of Classification Search
CPC ..... H04W 48/10; H04W 48/16; H04W 16/14; H04W 48/18; H04W 88/06
USPC ........... 455/434, 435.1–435.3, 450–453, 455, 455/552.1
See application file for complete search history.

(56) References Cited

U.S. PATENT DOCUMENTS

| 7,636,793 | B1 | 12/2009 | Friedman |
| 2003/0179110 | A1 | 9/2003 | Kato |

(Continued)

FOREIGN PATENT DOCUMENTS

| CN | 1996784 A | 7/2007 |
| CN | 101002489 A | 7/2007 |

(Continued)

OTHER PUBLICATIONS

Didier Bourse et al., The $E^2R$ II Flexible Specrum Management (FSM) Framework and Cognitive Pilot Channel (CPC) Concept—Technical and Business Analysis and Recommendations, $E^2R$ II White Paper, 2007, pp. 1-52.

(Continued)

*Primary Examiner* — George Eng
*Assistant Examiner* — Nam Huynh
(74) *Attorney, Agent, or Firm* — Foley & Lardner LLP

(57) ABSTRACT

The invention concerns a method for transmitting beacon services to a User Equipment (UE) roaming in an area covered by several Radio Access Technologies (RAT's), the area comprising a plurality of geographical zones, each geographical zone comprising at least one network base station using several frequencies and at least one RAT among the plurality of RAT's, the User Equipment (UE) having various RAT capabilities and preferences and supporting several frequencies, the method comprising the step of periodically transmitting to the UE at least a beacon message M comprising information about the RAT's and the frequencies deployed in each zone of the area, and data indicating at least a validity period of the RAT's and the frequencies information.

14 Claims, 7 Drawing Sheets

(51) Int. Cl.
*H04W 48/12* (2009.01)
*H04W 88/06* (2009.01)

(56) References Cited

U.S. PATENT DOCUMENTS

| | | | |
|---|---|---|---|
| 2007/0002811 | A1 | 1/2007 | Faccin et al. |
| 2009/0239530 | A1 | 9/2009 | Luo et al. |
| 2010/0113083 | A1* | 5/2010 | Luo et al. ............ 455/515 |
| 2011/0130164 | A1* | 6/2011 | Sagae et al. .......... 455/517 |
| 2012/0034917 | A1* | 2/2012 | Kazmi ................. 455/434 |

FOREIGN PATENT DOCUMENTS

| | | |
|---|---|---|
| JP | 2009-100452 A | 5/2009 |
| WO | WO 2007/016031 A2 | 2/2007 |
| WO | WO 2007/124055 A2 | 11/2007 |
| WO | WO 2008/119380 A1 | 10/2008 |

OTHER PUBLICATIONS

Qixun Zhang et al., A Novel Mesh Division Scheme Using Cognitive Pilot Channel in Cognitive Radio Environment, IEEE Vehicular Technology Conference, 2009, pp. 1-6.

Pieter Ballon & Simon Delaere, Flexible Spectrum Business Models for the Mobile Industry, IEEE, 7$^{th}$ International Conference on Mobile Business, 2008, pp. 86-94.

Jordi Pérez-Romero et al., A Novel On-Demand Cognitive Pilot Channel Enabling Dynamic Spectrum Allocation, New Frontiers in Dynamic Spectrum Access Networks, DYSPAN 2007, pp. 46-54.

Paul Houzé et al., Common Pilot Channel for Network Selection, IEEE Vehicular Technology Conference, 2006, pp. 67-71.

P. Cordier et al., E2R Cognitive Pilot Channel Concept, 15$^{th}$ IST Mobile and Wireless Communications Summit, Jun. 2006, 4 pages.

Office Action mailed Aug. 20, 2014 in related Chinese application No. 201180015993.4 with English-language translation (21 pgs.).

* cited by examiner

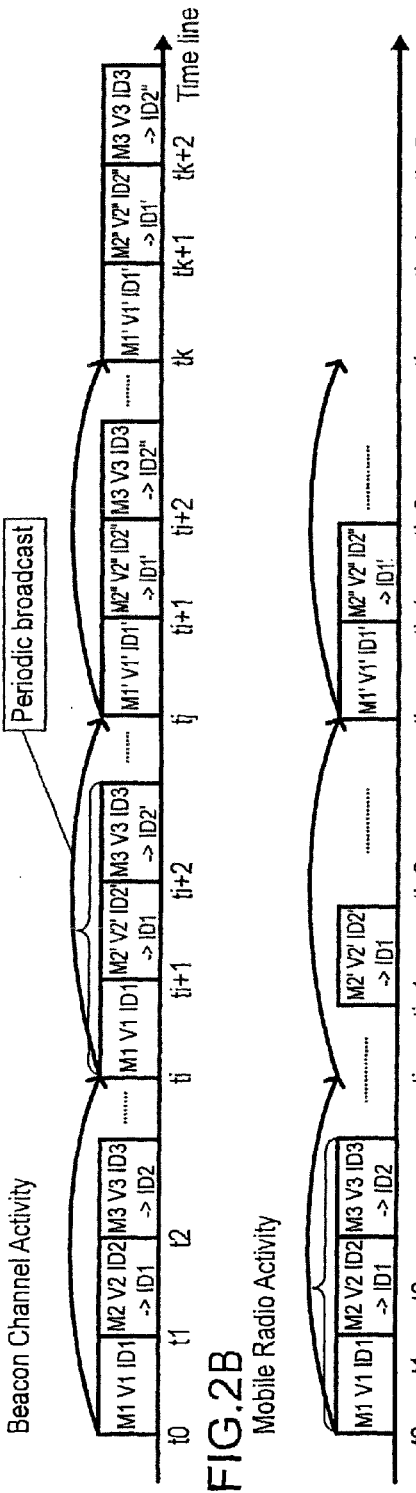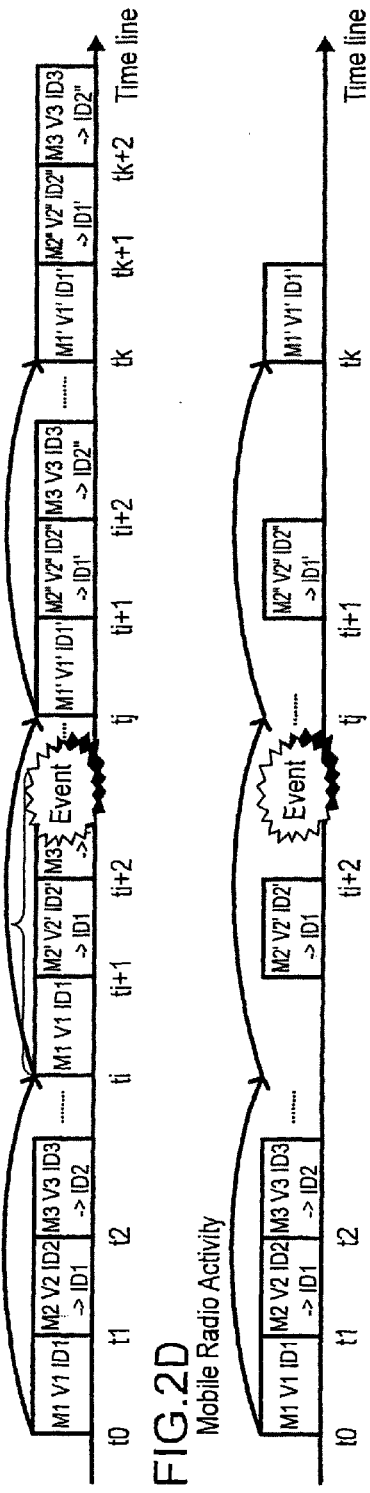

STAMPING MECHANISM FOR BEACON MESSAGE TRANSMISSION

PRIORITY CLAIM

The present application is the National Stage of Application No. PCT/JP2011/057500 filed on Mar. 18, 2011, which is based upon and claims the benefit of priority from European Patent Application No. 10157561.1, filed Mar. 24, 2010, the entire contents of which are incorporated herein by reference.

TECHNICAL FIELD

The invention pertains to telecommunication field and concerns a method for transmitting beacon services to a User Equipment (UE) roaming in an area covered by several Radio Access Technologies (RAT's), the area comprising a plurality of geographical zones, each geographical zone comprising at least one network base station using several frequencies and at least one Radio Access Technology (RAT) among the plurality of RAT's, the User Equipment (UE) having various RAT capabilities and preferences and supporting several frequencies.

The invention also concerns a beacon base station for transmitting the Beacon services and a User Equipment (UE) adapted to receive the beacon services transmitted by the Beacon base station.

BACKGROUND ART

A user roaming in an area covered by several telecommunication networks may choose an operator, a RAT (Radio Access Technology), and/or a frequency of communication based on roaming agreements between operators in this area and on the capabilities and preferences of its User Equipment (UE).

Cognitive Pilot Channel (CPC) is a kind of Beacon channel that may be used in cognitive radio to provide information to cognitive mobiles about the available operators, Radio Access Technologies (RAT's) and Frequencies available in the geographical area.

The CPC is used to support a terminal during the "start-up" phase and "on-going" phase:

During the start-up phase, beginning, at "switch on" of the mobile terminal, the mobile terminal is searching for a candidate network to camp on; and In the "on-going" phase, the mobile terminal is camping on a network with a dedicated RAT and is able to listen to CPC message broadcasted through the network in order to rapidly detect changes in the environment due to either variation of the mobile position or network reconfigurations.

From this two mobile state, different CPC deployment approaches are possible:

In the out-band CPC solution, where the CPC is conceived as a radio channel outside the component Radio Access Technologies, the CPC either uses a new radio interface, or alternatively uses an adaptation of legacy technology with appropriate characteristics; and In the in-band CPC solution, the CPC is conceived as a logical channel within the technologies of the heterogeneous radio environment.

For both deployments, a CPC manager broadcasts CPC information continuously and periodically for all mobiles presents in the CPC area.

Two major concepts for Cognitive Pilot Channel are proposed by the E3 project and ETSI RRS Group in order to organize RAT's information according to a geographical area: Mesh based approach and Coverage area approach.

In Mesh based concept, a geographical area covered by a beacon channel, is divided into a plurality of zones, called meshes and information is provided about operators RAT and frequencies available in each mesh.

In Coverage area concept, information about all the RAT's and frequencies available with respective RAT's coverage area in the area covered by a beacon channel is broadcasted in the geographical area.

FIG. 1 illustrates a geographical area 2 divided in different zones 4, each zone being covered by a network base station 6 using a Radio Access Technology (RAT) and receiving Beacon services from a Beacon base station 8.

In Mesh based concept, CPC information represents a large quantity of data to be sent especially if the mesh size is small. This forces mobile phones roaming in area 2 to listen to CPC channel longer than coverage area approach. It is to be noted that CPC information are updated according to the network load (new frequencies available or not) and network structure update (new technology, new frequencies, new operator). The frequency update is low between several posts of CPC message, therefore a mobile phone will receive several time the same information.

One of the proposed methods to reduce the CPC data rate is to transmit one CPC message for the whole CPC area, not to meshes of the CPC area, and transmit the coverage area for each technology and frequency. The problem with this kind of approach is that coverage areas are not easily characterized and transmitting a detailed coverage area may result in a large data-rate as well.

DISCLOSURE OF INVENTION

The invention aims at optimizing the UE's radio use to improve the UE's power saving.

The object of the invention is achieved by means of method for transmitting beacon services to a User Equipment (UE) roaming in an area covered by several Radio Access Technologies (RAT's), the area comprising a plurality of geographical zones, each geographical zone comprising at least one network base station using several frequencies and at least one RAT among the plurality of RAT's, the User Equipment (UE) having various RAT capabilities and preferences and supporting several frequencies.

The method according to the invention comprises the step of periodically transmitting to the UE at least a beacon message M comprising information about the RAT's and the frequencies deployed in each zone of the area, and data indicating at least a validity period of the RAT's and the frequencies information.

The method according to the invention further comprises the step of regularly updating the information carried by the beacon message M based on feedback information are provided by the network base stations and/or a CPC database and/or a PMSE database (program making and social events) cooperating with the network base station 6 in the area.

It is to be noted that the validity period of the information carried by the beacons messages may be a fixed period scheduled (e.g. expired in 60 s or after ten CPC messages broadcasting) with a predefined recurrence (e.g. 60 s, everyday or every 2 hours).

In another variant, the validity period is a predefined period the validly of which is defined by means of an expiry date (e.g. Jan. 1, 2010 at 10 a.m.), the expiry date being scheduled with a predefined recurrence (e.g. every day or every 2 hours).

Upon reception of a beacon message M, the UE reads the data indicating the validity period, and enters in an idle state if the validity period has not yet expired, or reads the beacon message received subsequently in order to get updated information if the validity period has already expired.

The feedback information used to update the information carried by the beacon message M may comprise the UE location in the given zone, the current network base station load in a given zone, and/or a PMSE (program making and social events) predictable in the given zone.

In a particular embodiment of the invention, the method comprises the steps of:

defining in the area n specific sub-zones $Z_i$ (i=1 to n), n being an integer, defining the beacon message M as a set of successive sub-messages $M_i$ (i=1 to n), each sub-message $M_i$ carrying information about a specific RAT and/or a specific frequency deployed in a specific sub-zone $Z_i$ of the area, the validity period $V_i$ of the specific information, and an identifier $ID_i$ of the sub-message $M_i$, including in each sub-message $M_i$ (i=1 to n) the identifiers of the sub-messages $M_i$ (i=1 to n) carrying information previously updated, broadcasting the set of sub-messages $M_i$ in the area, retrieving by the UE the identifiers of sub-messages $M_i$ carrying updated information, reading by the UE only the sub-messages $M_i$ corresponding to the retrieved identifiers.

The method according to the invention may be implemented in a geographical area comprising a plurality of meshes, in which the beacon message M is transmitted over a CPC (Cognitive Pilot Channel).

The beacon services are broadcasted in the Equipment (UE) roaming area by a Beacon base station comprising means for periodically broadcasting in the roaming area at least a beacon message M comprising information about the RAT's and the frequencies deployed in each zone of the area, and data indicating at least a validity period of the RAT's and the frequencies information.

The Beacon base station further comprises means for regularly updating the information carried by the beacon message M based on feedback information received from the network base stations.

In the particular embodiment of the invention, the Beacon base station comprises:

means for defining in the area n specific sub-zones $Z_i$ (i=1 to n), n being an integer, means for defining the beacon message M as a set of successive sub-messages $M_i$ (i=1 to n), each sub-message $M_i$ carrying information about a specific RAT and/or a specific frequency deployed in a specific sub-zone $Z_i$ of the area, the validity period $V_i$ of the specific information, and an identifier $ID_i$ of the sub-message $M_i$, means for including in each sub-message $M_i$ (i=1 to n), the identifiers of the sub-messages $M_i$ (i=1 to n), the identifiers indicating to the UE the sub-messages $M_i$ carrying updated information.

Thanks to the invention, information relating to RAT and frequency available in a geographic area can be grouped together in temporally way within one or several beacon message(s) enabling optimization of the battery consumption and also a permanent storage of the information in memory of the User Equipment.

BRIEF DESCRIPTION OF THE DRAWINGS

The foregoing summary, as well as the following detailed description, will be better understood when read in conjunction with the appended figures illustrating an exemplary embodiment of the invention in which:

FIGS. 2A to 2D represent a diagram illustrating an example of periodic broadcast of a beacon message in the area of FIG. 1 and the UE equipment behavior upon reception of the message according to the invention;

EMBODIMENTS FOR CARRYING OUT THE INVENTION

Figure 1:
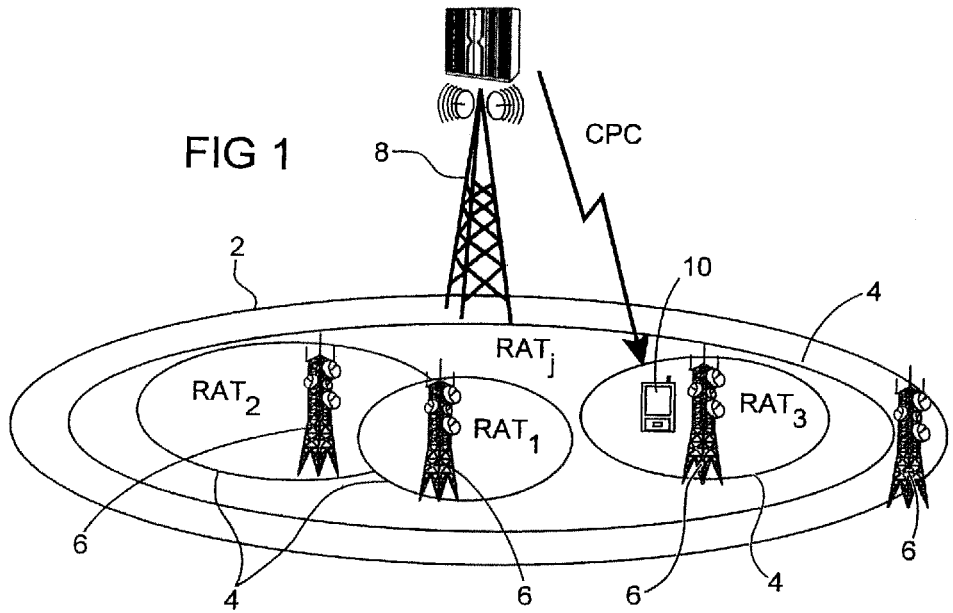
FIG. 1 schematically represents a UE roaming area divided in zones covered by different RAT's.

The invention will be described when implemented in a geographical area 2 divided into n elementary zones 4, as illustrated at FIG. 1, each zone being covered by a network base station 6 using a specific RAT and a specific frequency for communication.

A beacon base station 8, supervised by a beacon base manager, periodically transmits information on operators, Radio Access technologies (RAT's) and radio frequencies available in the geographical area 2 to cognitive UEs 10 such as mobile phones, PDA, or laptops roaming in the area 2 to allow the UEs to choose the most convenient operator, RAT and frequency available in the geographical area.

In a first embodiment of the invention, at the operator side, the beacon base station 8 generates a beacon message M comprising information about the RAT's and the frequencies deployed in each zone of the area 2, computes the validity period of the information and includes the computed validity period in beacon message M. Preferably, an error rate of the computed validity period is also included in the beacon message M. The UE 10 will use its CPC radio resources depending on a predefined error threshold.

In the example illustrated at FIG. 2A, the beacon message M is broadcasted over a CPC (Cognitive Pilot Channel) channel and is composed of a set of three successive sub-messages $M_i$ (i=1 to 3), each sub-message $M_i$ carrying information about a specific RAT and/or a specific frequency deployed in a specific sub-zone $Z_i$ (i=1 to 3) of the area 2. Each sub-messages $M_i$ (i=1 to 3) carries the validity period $V_i$ (i=1 to 3) of the specific information, and identifier $ID_i$ (i=1 to 3) of the sub-message $M_i$.

The sub-message $M_i$ are then broadcasted periodically in the area 2 as illustrated at FIG. 2A.

The beacon base station 8 transmits each set of sub-messages $M_i$ (i=1 to 3) at successive times t0 to t2, ti to ti+2, tj to tj+2, . . . , tk to tk+2, and so on.

FIG. 2B illustrates the UE 10 behavior upon reception of the sub-message $M_i$ (i=1 to 3).

The UE 10 receives the set of sub-messages Mi (i=1 to 3), at successive times t0 to t2, ti to ti+2, tj to tj+2, . . . , tk to tk+2, and so on.

To avoid unnecessary reception of non updated information, for each sub-message Mi (i=1 to 3), the UE 10 compares the validity period Vi with the duration that elapsed between the time of receipt of the sub-message Mi (i=1 to 3), during the current reception period and the time of receipt of the sub-message Mi (i=1 to 3), during the previous reception period. If the validity period Vi is greater than the duration, the UE 10 does not use its CPC resources for receiving the information carried by the sub-message Mi (i=1 to 3), else, the UE 10 use its CPC resources for receiving the information carried by the sub-message Mi (i=1 to 3).

In the example illustrated by FIGS. 2A and 2B, it is assumed that the sub-message M2 is updated a first time at time ti+1, the sub-message M1 is updated at time tj, and the sub-message M2 is updated again at time tj+1. The validity period of the updated information carried by the sub-message M2 has been modified consequently at time ti+1, and at time tj+1 respectively to V2' and V2". In this case, the new validity periods V2' and V2" of the updated information carried by the messages M2' and M2" are also updated.

At the reception side, at time ti+1, after the comparison procedure described above, the UE 10 finds that the updated validity periods VT of the updated information carried by sub-message M2' is less than the duration that elapsed between the time ti+1 and the time of receipt of sub-message M2 during the previous reception period. Similarly, at time tj, the UE 10 finds that the updated validity periods V1' of the updated information carried by sub-message M1' is less than the duration that elapsed between the time tj and the time of receipt of the sub-message M1' during the previous reception period. At tj+1, the UE 10 finds that the updated validity period V2" of the updated information carried by sub-message M2" is less than the duration that elapsed between the time tj+1 and the time of receipt of the sub-message M2" during the previous reception period. Consequently, in this case, based on the assessment of the validity periods Vi (i=1 to 3) of each sub-message Mi (i=1 to 3), the UE 10 will open its radio when validity period Vi is elapsed, in order to decode only the updated information.

Thanks to the assessment of the validity periods, the UE 10 is able to reduce its CPC radio activity and listen hack to the CPC only when the CPC information has been or should be updated.

Referring now to FIGS. 2C and 2D, illustrating the situation of FIGS. 2A and 2B with the occurrence f an unpredictable event in the geographical area 2 that modifies one or all the validity periods Vi (i=1 to 3). Such event may be for example office hour, shopping, social event, UE 10 moving from an area to another area, etc.

As illustrated at FIG. 2C, we assume that such event occurs after the computing by the beacon base station of the validity periods Vi (i=1 to 3). The UE 10 will have the same behavior as in case depicted by FIG. 2B. However, if the event that occurred modifies V1, i.e., if the information carried by sub-message M1 has been updated due to this event, the UE 10 would be mislead by the previous validity period V1 and will therefore erroneously discard sub-message M1 carrying updated information.

To avoid such situation, the beacon base manager at the beacon base station includes in sub-message M2" the identifier of sub-message M1 to indicate to the UE 10 that information carried by sub-message M1 has been updated following the unexpected event. In this way, when the UE 10 reads the content of sub-message M2", it is informed about the new situation and gets back to sub-message M1 in the next decoding period in order to retrieve the updated information carried by sub-message M1'.

Thanks to the inclusion of the identifier of sub-message M1 in sub-message M2", the UE 10 is able to listen back to the CPC that has been updated after the computing by the beacon base station of the validity periods Vi (i=1 to 3).

In a preferred embodiment of the invention, the computing of the validity periods Vi is realized based on feedback information received from the network base stations 6.

Preferably, an error rate of the computed validity period is also included in the beacon message M.

Figure 3:
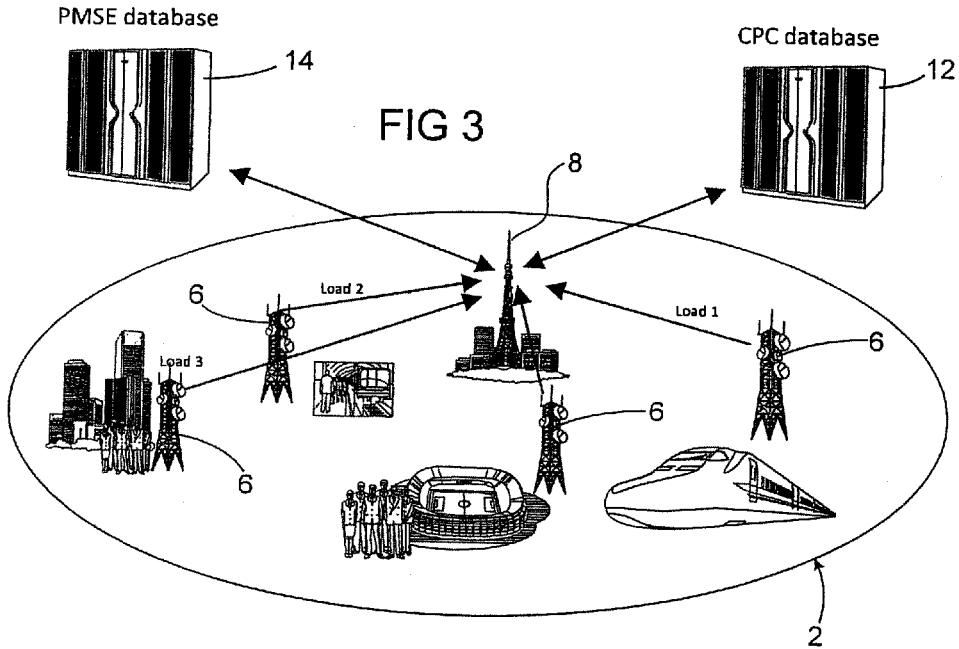
FIG. 3 schematically illustrates a system for implementing a preferred embodiment of the invention.

FIG. 3 illustrates a system in which the beacon base station 8 cooperates with, the network base stations 6 deployed in the area 2, with a CPC database 12 and with a PMSE database 14 to gather feedback information for computing the validity periods Vi (i=1 to 3) of the information carried by each CPC sub-message Mi (i=1 to 3).

In this architecture, each network base station 6 regularly transmits to the beacon base station 8 traffic load information in his area of radio coverage, the CPC database 12 regularly transmits to the beacon base station 8 previous overload and traffic load information, while the PMSE database 14 regularly transmits to the beacon base station 8 event list information in the area 2. The beacon base station 8 generates a frequency load curve based on the information received from the network base stations, the CPC database 12, and PMSE database 14, and uses the curves for predicting the validity periods of RAT and frequency information in each sub-zone of the area 2 based on the gathered information. Such prediction may use for example a Linear Prediction technique based on MMSE (Minimum Mean Square Error) applied on previous and current network information. The beacon base station 8 may for example acquire network information from the LTE (Long Term Evolution) X2 interface that enables an exchange of overload and traffic information.

Figure 4:
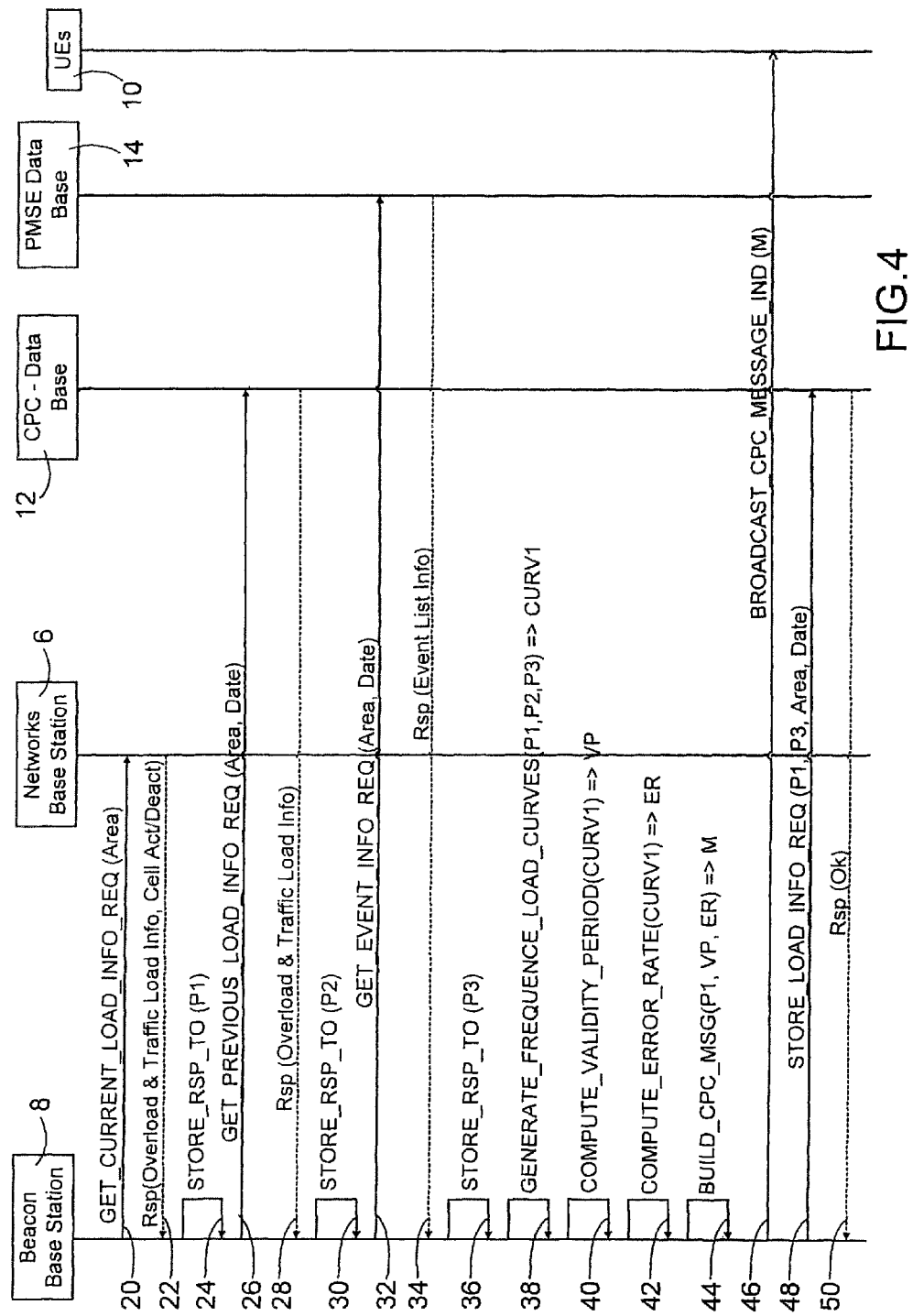
FIG. 4 is a flow chart illustrating beacon messages transmission/reception in the architecture of FIG. 3.

FIG. 4 illustrates the exchange of information between the beacon base station (BBS) 8, a network base station (NBS) 6, a UE 10 roaming in the coverage area of the NBS, the CPC database (CPCDB) 12, and the PMSE database (PMSEDB) 14.

At step 20, the BBS 8 transmits to the NBS 6 a request for current load information in the area coverage of the NBS 6. The BBS 8 gets network information from, for example, the LTE X2 interface. The feature load management enables to exchange overload and traffic load information.

At step 22, the NBS 6 transmits to the BBS 8 information about the overload and traffic load in its area coverage.

At step 24, the NBS 8 stores the information received from the BBS 6,

At step 26, the BBS 8 transmits to the CPCDB 12 a request for previous load information in the area coverage of the NBS 6.

At step 28, the CPCDB 12 transmits to the BBS 8 the requested information.

At step 30, the NBS 8 stores the information received from the CPCDB 12.

At step 32, the CPCDB 12 transmits to the PMSEDB 14 a request for information about current and the dates of scheduled events in the area coverage of the NBS 6.

At step 34, the PMSEDB 14 transmits to the CPCDB 12 a list of current event and the dates of scheduled event in coverage area of the NBS 6.

At step 36, the NBS 8 stores the information received from the PMSEDB 14.

At step 38, the BBS 8 generates a frequency load curve illustrating the time variation of the availability of a given frequency in the coverage area of the NBS 6. The Linear Prediction technique based on MMSE (Minimum Mean Square Error) is applied on previous and current network information. Then, the BBS 8 computes from the curve the validity period (step 40), and the error rate (step 42) of the information concerning the availability of the frequency in the coverage area. That is, the values VP and ER are extracted from generated frequency load curve.

At step 44, the BBS 8 defines a CPC message M based on the information received from the NBS 6, and on the validity period and the error rate computed at steps 40 and 42.

At step 46, the BBS 8 broadcasts the message M to the UE 10 present in the beacon area.

At step 48, the BBS 8 transmits the load information of the beacon area for the current date to the CPCDB 12 for storage.

At step 50, the CPCDB 12 transmits an acknowledgement message to the BBS 8.

Figure 5:
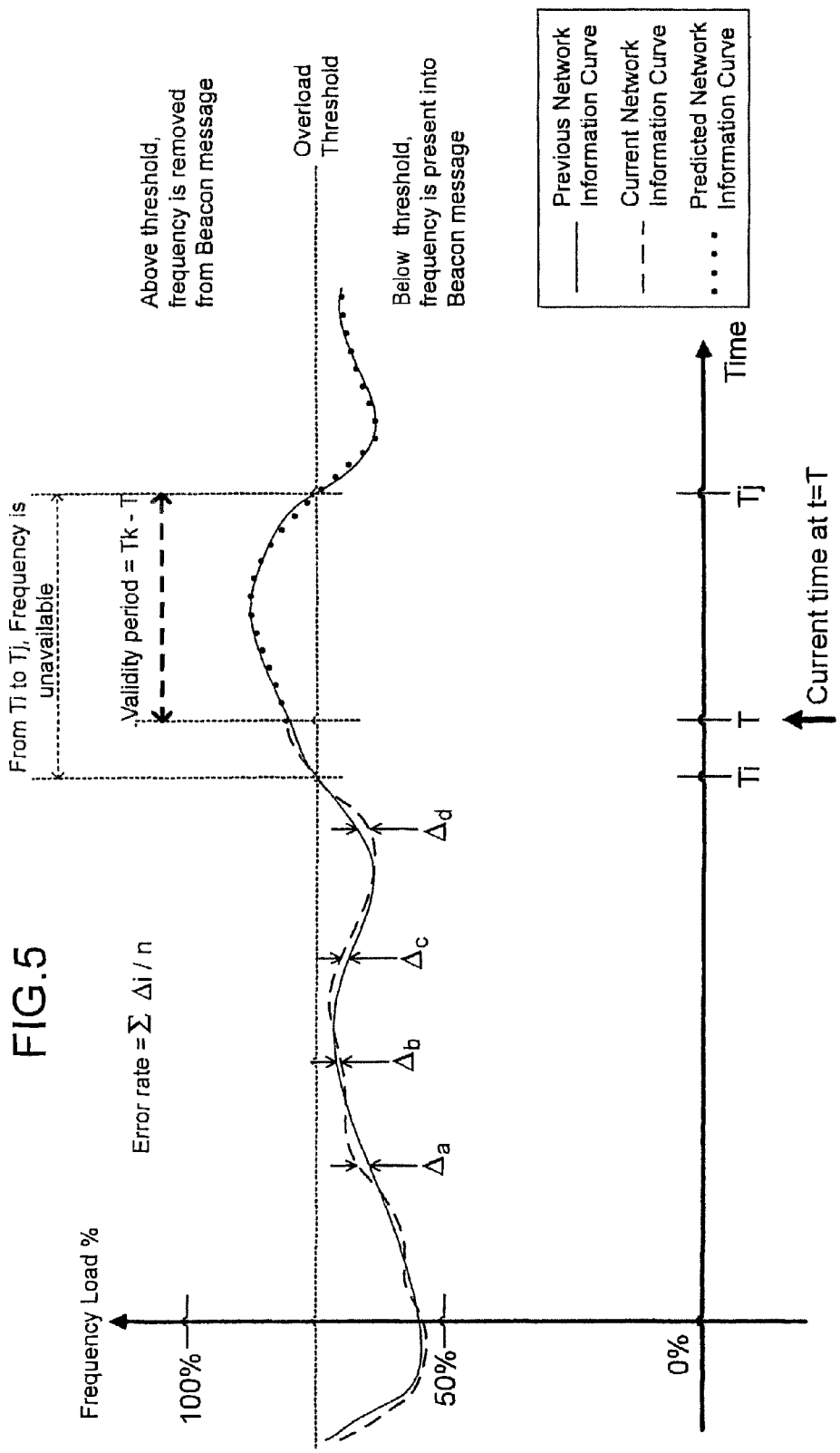
FIG. 5 schematically illustrates an example of load prediction method for one frequency of a network base station used in the method according to the invention in case of no PMSE event in the area.
Figure 6:
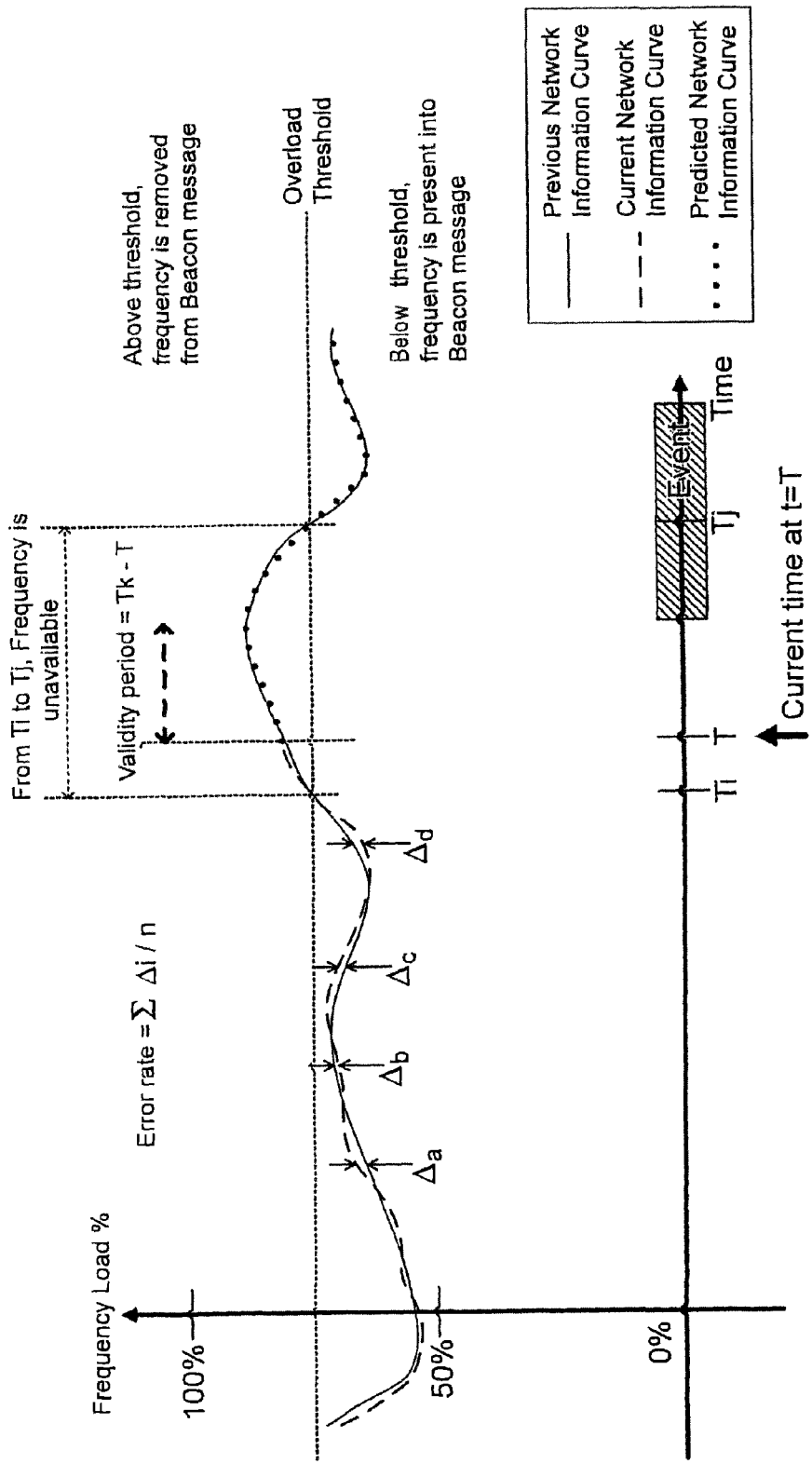
FIG. 6 schematically illustrates an example of load prediction method for one frequency of a network base station used in the method according to the invention in case of a PMSE event in the area.

FIGS. 5 and 6 depict an example of curves generated by the BBS 8 respectively in case of no PMSE event (FIG. 5) and in case of the occurrence of a PMSE event (FIG. 6) in the coverage area of the UE 10.

In FIGS. 5 and 6, "error rate" shown in the figures is an average value of the difference between the previous and current network information. "Validity period" is computed from the predicted curve thanks to the linear prediction technique based on MMSE applied on previous and current network information. Above threshold, frequency is removed from Beacon message, and below the threshold, frequency is present into Beacon message. In FIG. 6, during the periods from Ti to Tj, a special event occurs at t=Tk, then validity period is not only based on predicated value but truncated because radio environment can be different due to this event present in the area.

Figure 7:
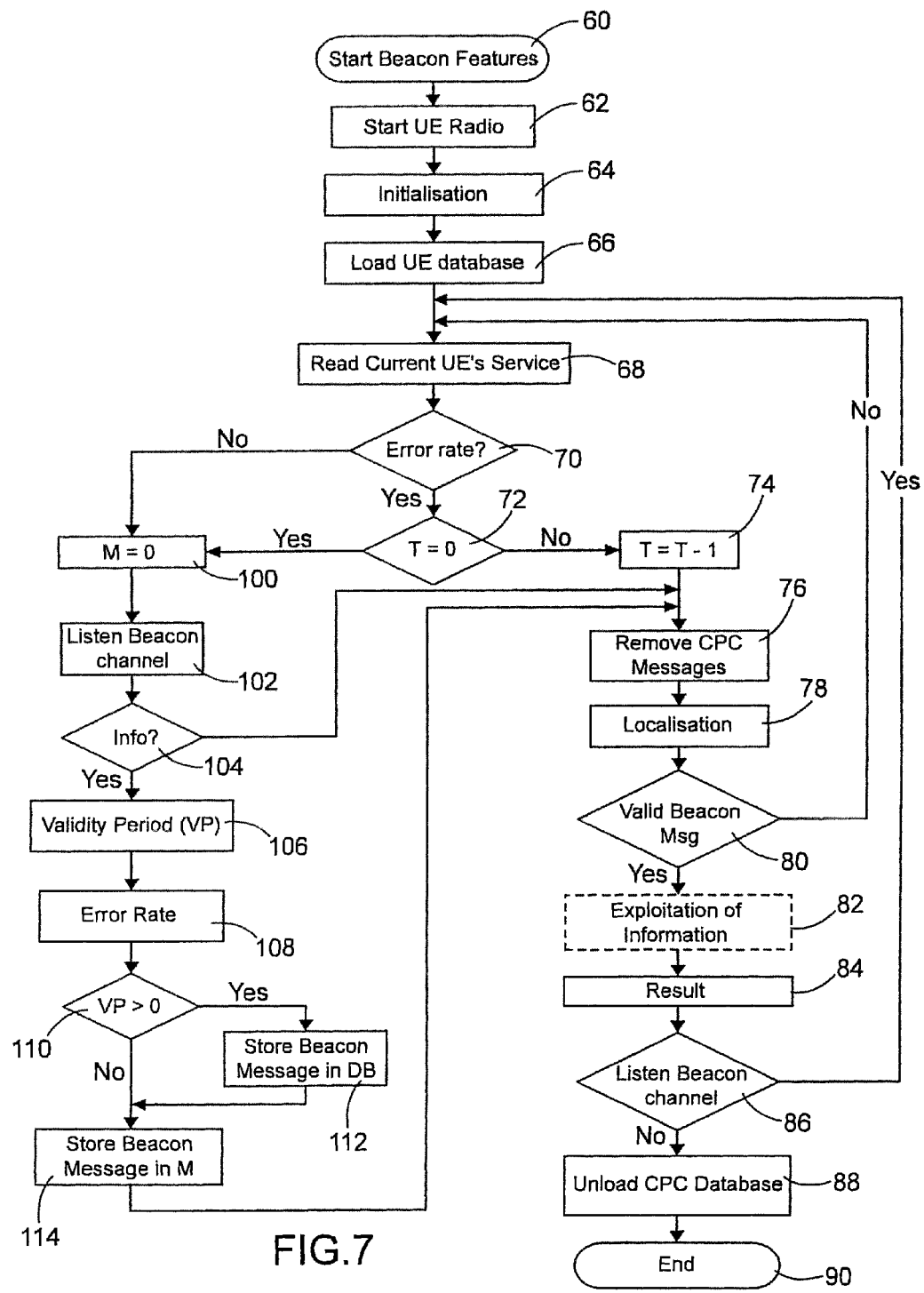
FIG. 7 is a flow chart illustrating an embodiment of the method according to the invention.

FIG. 7 illustrates the UE 10 behavior while roaming in area 2. The UE 10 is provided with a CPC module adapted for running a program for implementing the method according to the invention in the UE side.

At step 60, the CPC module starts CPC features, opens Radio for CPC channel (step 62), initializes variables relating to information validity period (T), error rate computed by the BBS 8 at step 42, services (S) and messages (M) (step 64) and loads the UE 10 database (step 66).

At step 68, the CPC module reads the parameters of the service currently used by the UE's and stores the parameters in a service memory storage.

At step 70, the CPC module verifies whether the error rate computed by the BBS 8 is appropriated to the UE 10 service or not.

If the error rate computed by the BBS 8 is appropriated to the UE 10, the CPC module verities, at step 72, whether the validity period T of the information relating to the service currently used is elapsed or not.

If the validity period T is not elapsed, it is decremented by the CPC module at step 74.

At step 76, the CPC module removes obsolete CPC messages from the UE CPC database, and gets UE geographical position at step 78.

At step 80, the CPC module checks if there is a valid CPC message in the CPC database or message M which could be used for the current UE's position.

If this is not the case, the process continues from step 68.

Else, the UE 10 exploits (step 82) the valid RAT and frequencies information defined for its current position.

At step 84, the CPC module reads the exploitation result.

At step 86, the CPC module checks whether the UE 10 continues to listen to the CPC channel or not.

If so, the process continues from step 68.

Else, the CPC module unloads CPC database and close UE'S radio for CPC channel at step 88, and closes the UE's CPC features at step 90.

If the error rate computed by the BBS 8 Is not appropriated to the UE's 10 service currently used, or if the validity period T of the information relating to the last CPC message received is elapsed, the CPC module initializes the variable M relating to CPC messages to zero (step 100) and configures the UE 10 to listen to the CPC channel (step 102).

At step 104, the CPC module Verifies whether information is received from the BBS 8 or not.

If no information is received, the process continues from step 76.

Else, the CPC module reads the validity period value at step 106 and the error rate value at step 108.

At step 110, the CPC module verifies whether the validity period is elapsed or not If so, the CPC module stores the CPC message in the UE CPC database (step 112).

Else, the CPC module stores the CPC message in the UE 10 (step 114) and continues the process from step 76.

Figure 8:
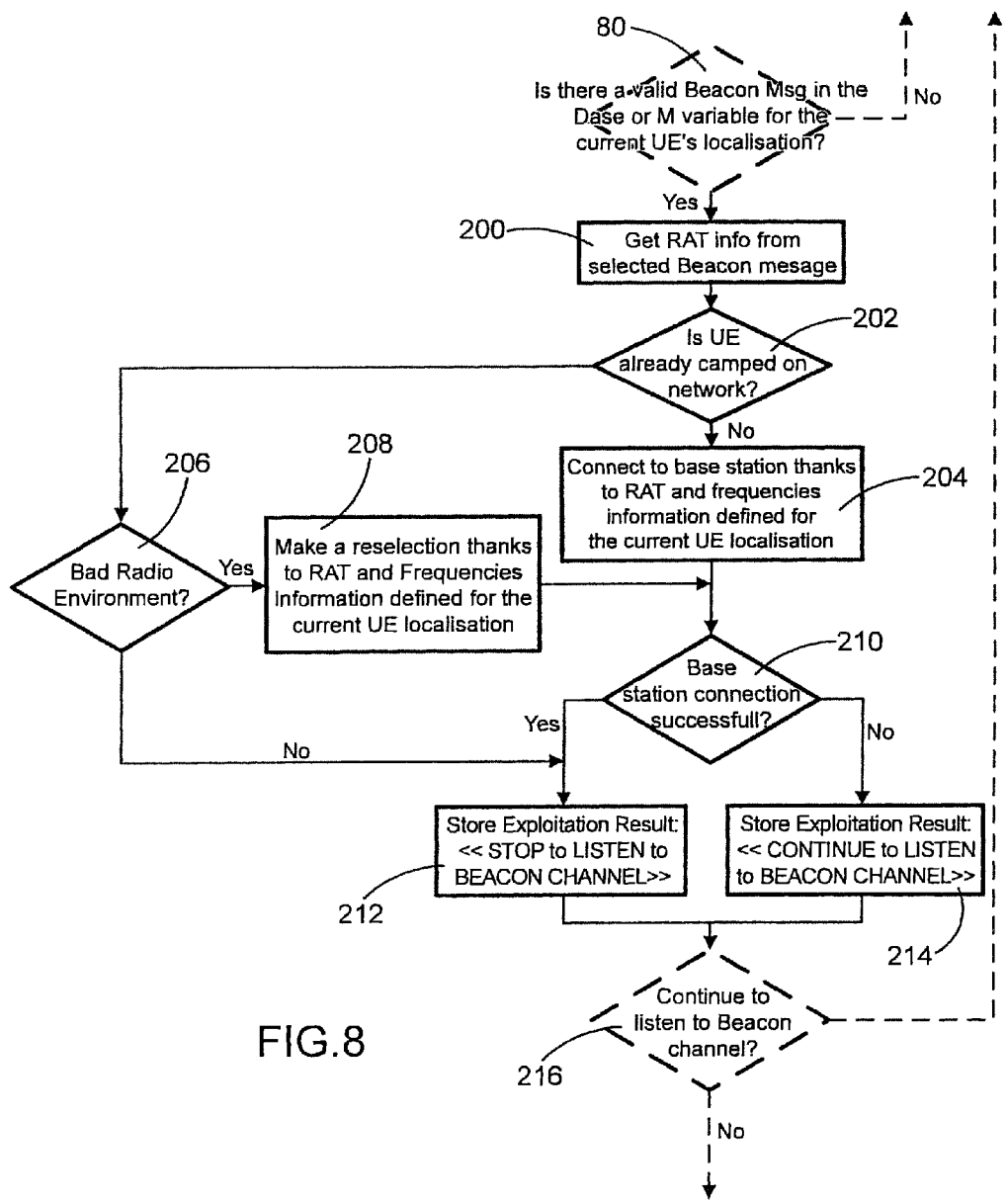
FIG. 8 is a flow chart illustrating an example of exploitation by the UE of information received in a beacon message.

FIG. 8 illustrates an example of the exploitation step 82 of the valid RAT and frequencies information received by the UE 10 from the BBS 8.

This process starts from step 200 in FIG. 8. At this step, the CPC module gets RAT information from selected CPC message.

At step 202, the CPC module verifies whether the UE 10 is already camped on a zone covered by a NBS 6 or not.

If no, the UE 10 connects to a NBS 6 using the RAT and frequencies information defined for the current UE geographical position (step 204).

Else, the CPC module verifies feedback information relating to the quality of the radio environment (step 206).

If the quality of the radio environment is bad, the CPC module makes a reselection using the RAT and frequencies information defined for the current UE geographical position (step 208).

The process continues at step 210 in which, the CPC module verifies whether the NBS connection is successful or not.

If so, the CPC module stores, at step 112, the exploitation result which is "STOP to listen to the CPC channel".

Else, the CPC module stores, at step 114, the exploitation result which is "CONTINUE to listen to the CPC channel".

If the quality of the radio environment is good, the process continues from step 112.

Embodiments of this invention have been described in detail above with reference to the drawings. However, the specific structure of this invention is not limited to these embodiments and other designs and the like are also included insofar as they do not depart from the scope of this invention.

INDUSTRIAL APPLICABILITY

The present invention is applicable to telecommunication field and particularly to beacon services to a UE roaming in an area covered by RAT's to improve the UE's power saving.

The invention claimed is:

1. A method for transmitting beacon services to a User Equipment (UE) roaming in an area covered by several Radio Access Technologies (RAT's), said area comprising a plurality of geographical zones, each geographical zone comprising at least one network base station using several frequencies and at least one RAT among said plurality of RAT's, said UE having various RAT capabilities and preferences and supporting several frequencies, said method characterized by periodically transmitting to the UE at least a beacon message M comprising information about the RAT's and the frequencies deployed in each zone of said area, and data indicating at least a validity period of said RAT's and said frequencies information, said method further comprising:

defining in said area n specific sub-zones Zi (i=1 to n), n being an integer; and defining the beacon message M as a set of successive sub-messages Mi (i=1 to n), each sub-message Mi carrying information about at least one of a specific RAT deployed in a specific sub-zone Zi of said area, a specific frequency deployed in a specific sub-zone Zi of said area, the validity period Vi of said specific information, and an identifier IDi of said sub-message Mi.

2. The method according to claim 1, further comprising the step of regularly updating the information carried by said beacon message M based on feedback information provided by the network base stations.

3. The method according to claim 2, wherein said feedback information is provided by a cognitive pilot channel (CPC) database and/or a program making and social events (PMSE) database cooperating with said network base station in said area.

4. The method according to claim 3, wherein, upon reception of a beacon message M, the UE reads the data indicating said validity period, and enters in an idle state if said validity period has not yet expired, or reads the beacon message received subsequently in order to get updated information if said validity period has already expired.

5. The method according to claim 3, wherein said feedback information comprises at least one of the UE location in said area, the current network base station load in said area, and a PMSE (program making and social events) predictable in said area.

6. The method according to claim 1, further comprising the steps of:
including in each sub-message Mi (i=1 to n), the identifiers of the sub-messages Mi (i=1 to n) carrying information previously updated;
broadcasting said set of sub-messages Mi in said area;
retrieving by the UE the identifiers of sub-messages Mi carrying updated information; and
reading by said UE only the sub-messages Mi corresponding to the retrieved identifiers.

7. The method according to claim 5, wherein said plurality of geographical zones consist of a plurality of meshes, and wherein said beacon message M is transmitted over a Cognitive Pilot Channel (CPC).

8. A beacon base station for broadcasting beacon services to a User Equipment (UE) roaming in an area, said area covered by several Radio Access Technologies (RAT's) and comprising a plurality of geographical zones, each geographical zone comprising at least one network base station using several frequencies and at least one RAT among said plurality of RAT's, said User Equipment having various RAT capabilities and preferences and supporting several frequencies, said Beacon base station comprises a processor and a non-transitory memory storing a set of instructions, which when executed by the processor, is configured to:
periodically transmitting to the UE at least a beacon message M comprising information about the RAT's and the frequencies deployed in each zone of said area, and data indicating at least a validity period of said RAT's and said frequencies information;
regularly updating the information carried by said beacon message M based on at least one of feedback information provided by the network base stations, a Cognitive Pilot Channel (CPC) database and a program making and social events (PMSE) database cooperating with said network base station in said area;
defining in said area n specific sub-zones Zi (i=1 to n), n being an integer; and
defining the beacon message M as a succession of successive sub-messages Mi (i=1 to n), each sub-message Mi carrying information about at least one of a specific RAT, a specific frequency deployed in a specific sub-zone Zi of said area, the validity period Vi of said specific information, and identifier IDi of said sub-message Mi.

9. The beacon base station according to claim 8, wherein the processor is further configured to include in each sub-message Mi (i=1 to n), the identifiers of the sub-messages Mi (i=1 to n) carrying information previously updated, said identifiers indicating to the UE the sub-messages Mi carrying updated information.

10. The beacon base station according to claim 9, wherein the processor is further configured to include an error rate of the computed validity period in said beacon message M.

11. The beacon base station according to claim 9, wherein the UE is adapted to receive beacon services from the beacon base station.

12. The beacon base station according to claim 11, wherein the UE further comprises a CPC module adapted for receiving CPC messages broadcasted by said beacon base station, said CPC module comprising means for verifying whether the validity period of the information carried by said CPC messages is elapsed or not.

13. A system for broadcasting beacon services to a User Equipment (UE) roaming in an area, said area covered by several Radio Access Technologies (RAT's), said area comprising a plurality of geographical zones, each geographical zone comprising at least one network base station using several frequencies and at least one RAT among said plurality of RAT's, said User Equipment (UE) having various RAT capabilities and preferences and supporting several frequencies, said system comprising a CPC (cognitive pilot channel) base station, a CPC database and a PMSE (program making and social events) database, said CPC base station cooperating with said network base station and with said PMSE database to gather feedback information for computing the validity periods of the information carried by CPC sub-messages broadcast by said CPC base station.

14. The system according to claim 13, wherein each network base station is configured for regularly transmitting to the CPC base station traffic load information in this area of radio coverage, the CPC database is configured for regularly transmitting to the CPC base station previous overload and traffic load information, and the PMSE database is configured for regularly transmitting to the CPC base station event list information in the area, and wherein, said CPC base station generates a frequency load curve based on the information received from the network base stations, from the CPC database, and from the PMSE database, and uses said curves for predicting the validity periods of RAT and frequency information in each sub-zone of the area based on the gathered information.

* * * * *